United States Patent [19]
Bradley et al.

[11] Patent Number: 4,938,436
[45] Date of Patent: Jul. 3, 1990

[54] SAFETY HARNESS AND BELT ASSEMBLIES FOR AIRCRAFT CREWMEMBERS

[75] Inventors: Gary F. Bradley, Hendersonville; Walter R. Peck, Asheville; James W. Duncan; Thomas M. Britton, both of Asheville, all of N.C.

[73] Assignee: Survival Engineering Corporation, Asheville, N.C.

[21] Appl. No.: 238,598

[22] Filed: Aug. 31, 1988

[51] Int. Cl.$^5$ .............................................. B64D 17/30
[52] U.S. Cl. ........................... 244/151 R; 244/122 R; 244/122 AH; 244/141; 244/151 A
[58] Field of Search ........... 244/122 B, 151 R, 151 A, 244/122 R, 122 AH, 122 A, 141, 1 R

[56] References Cited

U.S. PATENT DOCUMENTS 2,318,673  5/1943  Coleman ........................ 244/151 R Primary Examiner—Joseph F. Peters, Jr.
Assistant Examiner—Anne Sartelle
Attorney, Agent, or Firm—Roylance, Abrams, Berdo & Goodman

[57] ABSTRACT

A harness and belt assembly for a crewmember of an aircraft including left and right slings, a first belt assembly having first end second ends, a survival kit strap assembly attachment fitting which slidably engages the belt assembly, and a mechanism for releasably attaching the fitting to a seat of an aircraft. The slings are designed to extend from the chest of the crewmember, over the crewmember's shoulders, to the back of the crewmember. The first end of the belt assembly is attached to one of the slings at the portion designed to be adjacent the crewmember's chest. The second end of the belt assembly is attached to the other of the slings. A survival kit belt can be affixed to the fitting so that the survival kit ejects with the crewmember during an ejection.

20 Claims, 5 Drawing Sheets

SAFETY HARNESS AND BELT ASSEMBLIES FOR AIRCRAFT CREWMEMBERS

FIELD OF THE INVENTION

This invention relates to parachute harness and belt assemblies for aircraft crewmembers which strap and retain the crewmembers in their seats. More particularly, this invention relates to such harness and belt assemblies which include vests, belts extending around the vests and between the vests and the aircraft seats, and mechanisms for releasing the belts if it becomes necessary for the crewmembers to eject from the aircraft.

BACKGROUND OF THE INVENTION

Currently, U.S. Air Force crewmembers wear either PCU-15 or PCU-16 parachute harness assemblies while in flight. Such parachute harness assemblies have the primary functions of distributing parachute opening shock loads onto the human body and of suspending the user beneath the inflated parachute canopy after an ejection has taken place. These parachute harnesses are not designed to provide means for retaining the crewmembers in their respective aircraft seats during normal flight. Instead, all U.S. Air Force aircraft ejection seats are provided with a lap belt assembly and two inertia reel shoulder restraint straps to restrain crewmembers in their seats.

These two inertia reel straps have manual and automatic modes. While in the manual mode, the straps can be locked and unlocked by the seat occupant. In the automatic mode, the straps will lock when the negative Gx (forward) acceleration exceeds a set threshhold or when the strap and reel velocity exceeds a set threshhold level. However, the inertia reel straps do not apply any downward forces on the shoulders of the crewmembers and must not apply any such force in accordance with the controlling military specifications. This is because any downward loading directly on the shoulders may compress the spine and increase the risk of spinal injury in certain situations, for example, in an ejection. As a result, the inertia reel straps do not provide negative Gz (upward) restraint until the crewmember has moved upward off the seat pan a considerable distance even when the reel strap locking mechanism is locked. For small crewmembers, this distance can be over five inches.

Thus, the lap belt assembly is the only effective negative Gz restraint provided to crewmembers wearing the harness and lap belt assemblies currently employed by the U.S. Air Force.

The lap belt assembly is incorporated into the Advanced Concept Ejection Seat-II (ACES-II) currently employed by the U.S. Air Force in most of its new aircraft. The lap belt assembly is anchored to the aircraft seat at the seat back such that in normal use the lap belt is oriented at an angle less than 45° above the seat pan. Due to this arrangement, the lap belt provides both negative Gx and negative Gz restraint to the seat occupant's thighs and lower torso. However, even with the lap belt tight, a crewmember will still move upward off the seat pan when undergoing negative Gz acceleration, since the seat belt will rotate to a more upward angle with respect to the seat pan. This upward movement, when combined with the natural elongation of the human spine, can result in the head of the crewmember moving upward over five inches. Also, even with the lap belt tight, there is very little Gy (lateral) support of the crewmember's shoulders or upper torso.

While it is desirable to wear the lap belt as tight as possible to limit negative Gz movement, wearing the belt tight will reduce the aftward viewing ability of the crewmember (also referred to as "check six" capability). This affects the pilot's efficiency in combat maneuvers since the pilot desires full aftward viewing. Thus, many pilots and crewmembers develop the habit of flying with the lap belt loose so that it does not affect their aftward viewing ability. With the lap belt loose, the upward movement of the crewmember during negative Gz acceleration increases even more, and contact of the helmet with the cockpit canopy is common.

In the ACES-II, the survival kit is located under the seat pan. The survival kit is attached to the PCU-15 or PCU-16 parachute harness by adjustable side straps which extend from the kit under the seat pan up to the harness. Some crewmembers tighten these side straps to limit their potential Gz movement. However, in doing so, the rotation of the upper torso or shoulders is severely limited, and the "check six" capability is essentially eliminated. Also, any negative Gz acceleration will result in forces being applied to the seat pan, which is not structurally capable of supporting large upward forces.

The ACES-II includes a mechanism for automatic release of the lap belt anchor fittings as well as the two inertia reel straps after the crewmember has ejected. When this mechanism is released, the crewmember is free to separate from the seat. Since the survival kit is attached to the crewmember's harness, the survival kit will also separate from the seat.

It is clear that there is a need for an improved harness and belt assembly which will adequately restrain the movement of the crewmembers in all directions, including the negative Gz direction while not limiting the torso rotation of the crewmember to "check six", i.e. without affecting the aftward viewing ability of the crewmember.

This need has become more critical in view of the increased performance levels of military aircraft. The basic design of the PCU-15 or PCU-16 harnesses is now over thirty years old. While some improvements have been made to the lap belt and inertia reel shoulder restraint strap systems during this time, there has been little if any functional improvement in the Gy or negative Gz restraint afforded by these systems.

This invention addresses this need in the art, as well as other needs which will become apparent to those skilled in the art once given this disclosure.

SUMMARY OF THE INVENTION

This invention provides a harness and belt assembly for a crewmember of an aircraft. The harness and belt assembly includes left and right slings, two belt assemblies each having first and second ends, two fittings which slidably engage the belt assemblies, one of the fittings being on each belt assembly, and a mechanism for releasably attaching the fittings to a seat in an aircraft. The left and right slings extend from the chest of the crewmember, over the shoulders of the crewmember, and cross each other on the upper back of the crewmember. The first end of the first belt assembly is attached to the portion of one of the slings adjacent the crewmember's chest. The second end of the first belt assembly is attached to the other of the slings on the crewmember's back below the crossover point. The second belt assembly is symmetrically identical to the first belt assembly on the opposite side of the harness.

In some embodiments of this invention, the first and second belt assemblies each include first and second belts and an adjuster. Each of the belts has first and second ends. The first end of the first belt comprises the first end of the first or second belt assembly. The first end of the second belt comprises the second end of the first or second belt assembly. The second ends of both belts are attached to the adjuster such that the adjuster may be employed to adjust the total length of the first or second belt assembly.

In certain embodiments of this invention, the mechanisms for releasably attaching the fittings to the seat of an aircraft include a survival kit belt and an anchoring assembly. The survival kit belt releasably engages the anchoring assembly. The anchoring assembly is affixed to the seat.

In other embodiments, the two belt assemblies may be replaced by a single belt assembly which extends from the front portion of the right sling, through a fitting attached to the back portions of both of the slings, to the front portion of the left sling.

The harness and belt assemblies according to this invention have many advantages over other prior harness and belt assemblies for crewmembers of aircraft.

One advantage of these harness and belt assemblies is that the negative Gz restraint and the positive and negative Gy restraint is greatly improved, while increasing the crewmember's ability to rotate his upper torso as necessary to look aftward toward the aircraft tail. As discussed above, the ability to look aftward, also known as "check six" capability, may be critical during combat encounters.

Another advantage of the harness and belt assemblies of this invention is that these assemblies eliminate any loading on nonstructural elements of the aircraft seat which exceeds the capacity of those elements All of the forces involving the harness and belt assemblies of this invention are applied to structural elements which are capable of supporting the loads.

A further advantage of the harness and belt assemblies of this invention is that the assemblies are released whenever the lap belt is released after a crewmember has ejected.

Yet another advantage of the harness and belt assemblies of this invention is that the basic structure of the current parachute harness does not change, and thus the modified harness functions in the same manner during parachute operation as it did before modification.

It is a further advantage of the harness and belt assemblies of this invention that the basic structure of the current lap belt assembly is unchanged such that the lap belt assembly continues to perform the function of restraining the seat occupant under any forward or downward crash load encounters.

Yet another advantage of the harness and belt assemblies of this invention is that the comfort and safety of the occupant is improved.

A further advantage of this invention is that the existing harnesses worn by Air Force personnel in flight and the current ejection seats employed in Air Force aircraft can be easily and quickly modified at field installations to embody modified harness and belt assemblies according to this invention. No special equipment is needed to modify the existing harnesses and ejection seats to embody this invention.

Yet another advantage of the harness and belt assemblies according to this invention is that the assemblies can be easily altered to restrain or not restrain the lateral movement at the crewmember's option while maintaining all the other desirable objectives and features of this invention.

The following Figures are provided to describe certain embodiments of this invention, as well as the most relevant prior art, wherein:

Certain embodiments of this invention and certain prior art will now be described in detail with respect to these Figures, wherein:

DETAILED DESCRIPTION OF THE DRAWINGS

Figure 1:
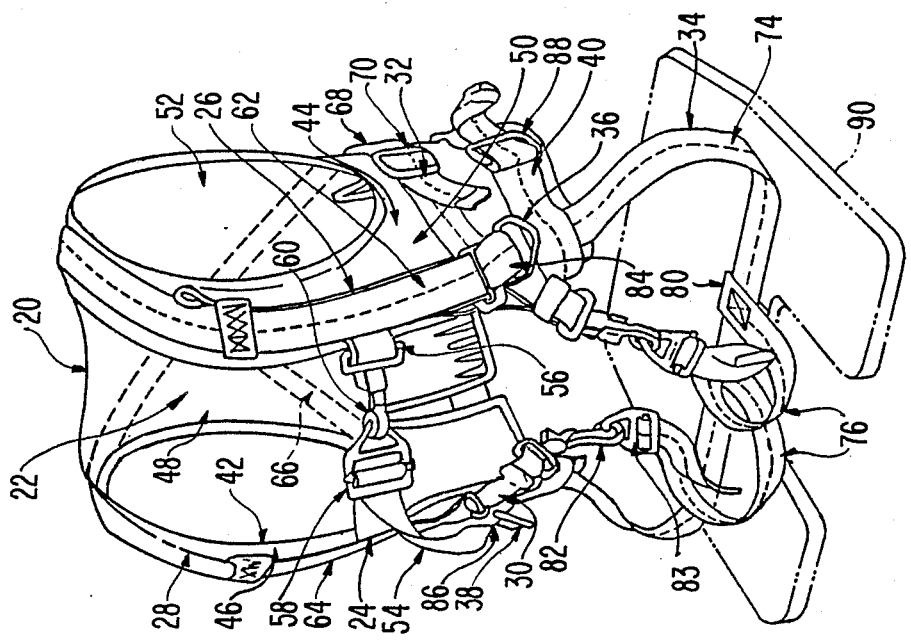
FIG. 1 is a right front perspective view of the PCU-15 or -16 harness and belt assembly currently employed by an Air Force crewmember (prior art).

FIG. 1 illustrates a prior art parachute harness assembly, harness assembly 20. Harness assembly 20 is shown as it would appear on a person sitting in an aircraft seat including seat pan 90. Harness assembly 20 is in fact representative of PCU-15 and -16 harnesses which are currently worn by Air Force crewmembers.

Harness assembly 20 includes vest 22, cross chest strap assembly 24, left lift sling 26, right lift sling 28, left lift sling extension 30, right lift sling extension 32, main lift sling assembly 34, survival kit attachment fittings 36 and 38 and waistband strap assembly 40.

Vest 22 is designed to partially cover the shoulders and upper torso of a crewmember. Vest 22 can be divided into right half 42 and left half 44, with the dividing plane between the halves being located equally between the shoulders, perpendicular to a line connecting the shoulders.

Each of these halves 42 and 44 has front and rear portions. Thus, right half 42 includes front portion 46 and rear portion 48 and left half 44 includes front portion 50 and rear portion 52. The respective front portions 46 and 50 basically extend from the mid-lines of the arms forward, while rear portions 48 and 52 extend from the mid-lines of the arms rearward.

Cross chest strap assembly 24 includes straps 54 and 56, adjuster 58, and connector 60.

One end of strap 54 is attached to right lift sling 28 and one end of strap 56 is attached to left lift sling 26. The other end of strap 54 is attached to connector 60. The other end of strap 56 is attached to adjuster 58. Connector 60 may be brought into engagement with adjuster 58 to partially strap harness assembly 20 onto a person. Adjuster 58 may be employed to loosen or tighten strap assembly 24.

Left and right lift slings 26 and 28 extend from front portions 46 and 50, over the shoulders of vest 22 and onto rear portions 48 and 52. Left and right lift slings 26 and 28 cross at the back of vest 22 and are sewn to vest 22 over the shoulders and across the back.

In this manner, lift slings 26 and 28 have front portions 62 and 64 and rear portions 66 and 68, respectively.

Lift sling extensions 30 and 32 are affixed to rear portions 66 and 68, respectively, by adjusters, see adjuster 70 which affixes lift sling extension 32 to rear portion 68. Basically, lift sling extensions 30 and 32 extend frontwardly of rear portions 66 and 68, respectively, under the arm holes in vest 22.

Main lift sling assembly 34 includes main lift sling 74 and two leg straps 76. Leg straps 76 have stitched loops 80 on one end thereof. The other ends of leg straps 76 are attached to adjusters 83. Both ends of main lift sling 74 pass through fittings on the ends of lift slings 26 and 28, continue through connectors 82 to form lift sling extensions 30 and 32. The stitched loops 80 of leg straps 76 are sewn to main lift sling 74 such that the legs of a crewmember are received between main lift sling 74 and the two front belts 76.

Connectors 82 are brought into engagement with adjusters 83 to fasten main lift sling assembly 34 around the legs of a crewmember.

Survival kit attachment fittings 36 and 38 are attached by short straps 84 and 86 to front portions 62 and 64 of lift slings 26 and 28, respectively. Short straps 84 and 86 pass through loops (not shown) attached to vest 22.

Figure 6A:
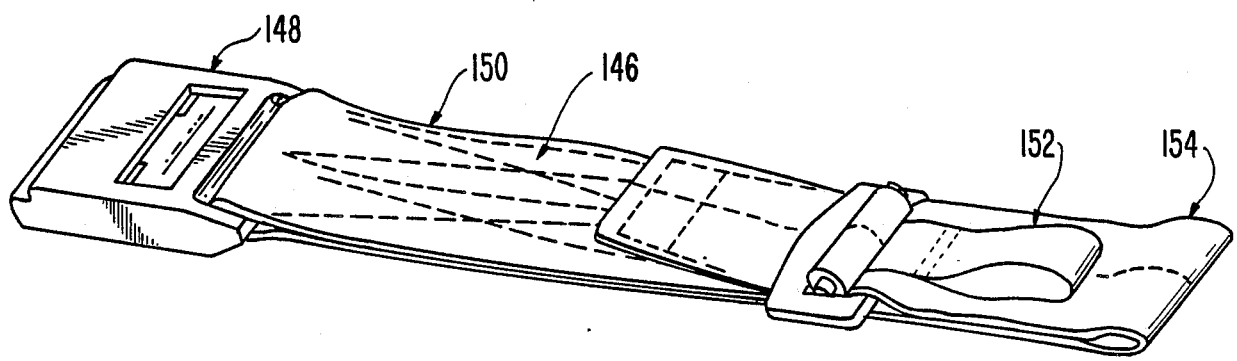
FIG. 6A is a top perspective view of a survival kit strap assembly which can be employed with the embodiments of this invention illustrated in FIGS. 2-5.

Harness assembly 20 is designed to be employed with survival kit strap assembly 146 (see FIG. 6A). Survival kit assembly 146 includes belt 150, adjuster 151 and connector 148. One end of belt 150 laps back over itself (forming loop 154) and passes through adjuster 151 so that the effective length of belt 150 can be adjusted. The other end of belt 150 is attached to connector 148. Loop 154 engages the survival kit. Fittings 36 and 38 are designed to engage connector 148.

Waistband strap assembly 40 has loops on its ends which receive main lift sling 74 therethrough. Waistband strap assembly 40 includes an adjuster 88 to adjust the length of waistband strap assembly 40.

Figure 2:
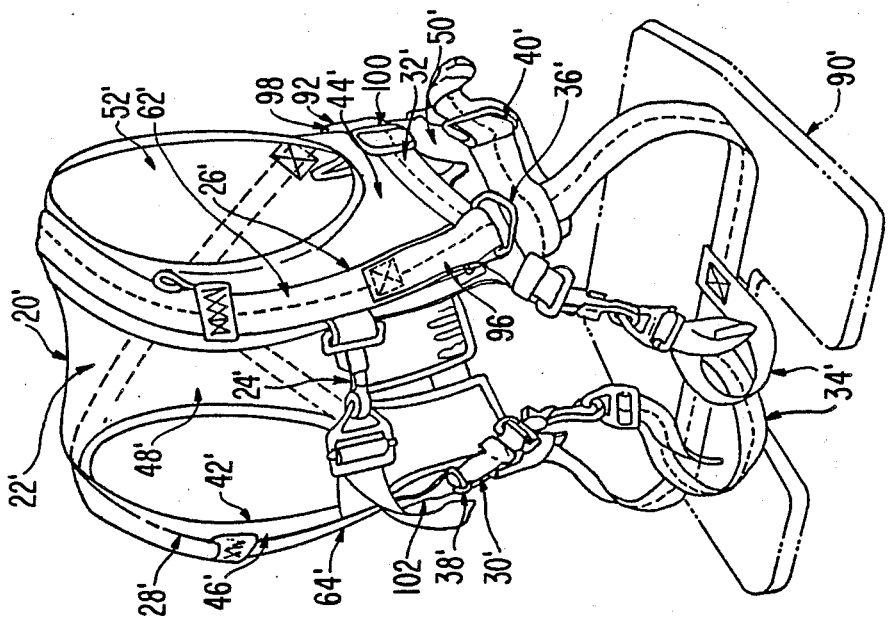
FIG. 2 is a right front perspective view of a harness and belt assembly according to this invention.

A PCU-15 or -16 parachute harness incorporating the belt assembly according to this invention is illustrated in FIG. 2, harness and belt assembly 20'. Harness and belt assembly 20' includes many of the same elements as harness assembly 20, and these same elements are given the same reference number with a prime mark, ('), added in the Figures. Specifically, harness and belt assembly 20' includes vest 22', cross chest strap assembly 24', left lift sling 26', right lift sling 28', left lift sling extension 30', right lift sling extension 32', main lift sling assembly 34', survival kit attachment fittings 36' and 38' and waistband strap assembly 40'.

As with harness assembly 20, vest 22' can be divided into right half 42' and left half 44'. Each half 42' and 44' includes front and rear portions. Specifically, right half 42' includes front portion 46' and rear portion 48' and left half 44' includes front portion 50' and rear portion 52'.

Also, as with harness assembly 20, left lift sling 26' and right lift sling 28' of harness and belt assembly 20' include front and rear portions. Specifically, left lift sling 26' includes front portion 62' and rear portion 66' and right lift sling extension 32' includes front portion 64' and rear portion 68'.

In addition to these elements, the harness and belt assembly 20' also includes belt assemblies 92 and 94 and adjustment fitting 100.

Each of the belt assemblies 92 and 94 includes two belts, a slideable fitting, and an adjuster. Specifically, belt assembly 92 includes belts 96 and 98, fitting 36 and adjuster 100; and belt assembly 94 includes belts 102 and 104, fitting 38, and an adjuster (not shown).

A first end of belt 96 is attached to front portion 62' of left lift sling 26'. The second end of belt 96 is in engagement with adjuster 100. A first end of belt 98 is attached to rear portion 66' of right lift sling 28'. The other end of belt 98 is in engagement with adjuster 100. In this manner, adjuster 100 is used to change the length of the combination of belts 96 and 98.

Likewise, a first end of belt 102 is attached to the front portion 64' of right lift sling 28'. The other end of belt 102 is in engagement with the adjuster. One end of belt 104 is affixed to rear portion 66' of left lift sling 26'. The other end of belt 104 is in engagement with the adjuster. The adjuster to which belts 102 and 104 are attached is used to adjust the total combined length of belts 102 and 104.

Survival kit attachment fittings 36' and 38' are slidably received on belt assemblies 92 and 94, respectively. In the embodiment illustrated in FIG. 2, fitting 36' is slidably received along belt 96 and fitting 38' is slidably received on belt 102.

Figure 3:
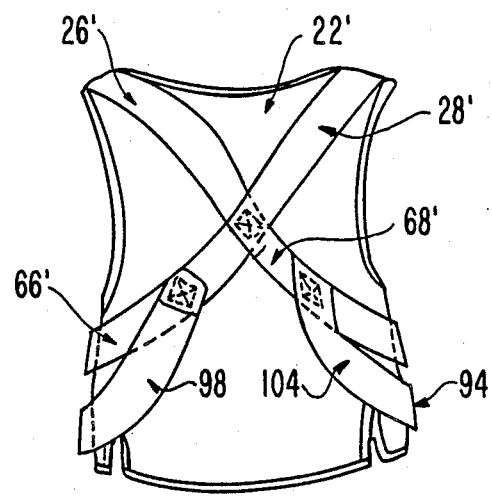
FIG. 3 is a back view of the embodiment of this invention illustrated in FIG. 2.

In the embodiment illustrated in FIGS. 2 and 3, belts 96 and 102 are longer than belts 98 and 104, respectively, such that the adjusters (including adjuster 100) are closer to the rear of belt assemblies 92 and 94 than the front. The length of belts 96, 98, 102 and 104 can be interposed in other embodiments such that belts 98 and 104 are longer than belts 96 and 102, respectively. In these embodiments, fittings 36' and 38' would be slidably located on belts 98 and 104 respectively.

Figure 6B:
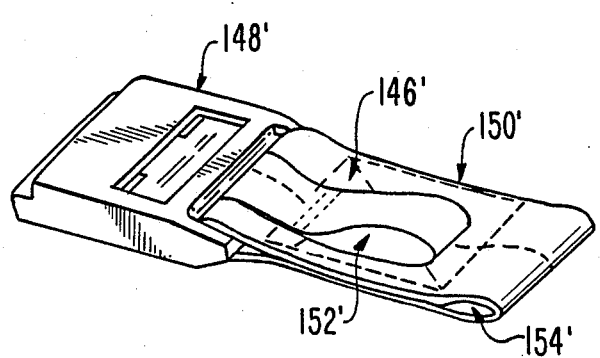
FIG. 6B is a top perspective view of a second survival kit strap assembly which can be employed with the embodiments of this invention illustrated in FIGS. 2-5.

To practice this invention, loops 152 and 152' are attached to the underside of belts 150 and 150', respectively (see FIGS. 6A and 6B).

In the embodiment of the invention illustrated in FIGS. 2 and 3, the lap belt assembly normally found on Air Force aircraft has been modified. One half of the lap belt assembly which is to be modified is illustrated in FIG. 7, prior to the modification.

Figure 7:
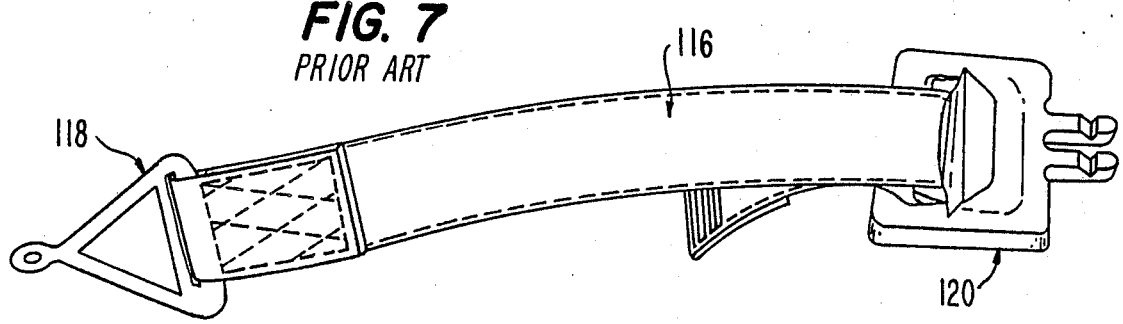
FIG. 7 is a top perspective view of a portion of one belt of the lap belt assembly currently employed in Air Force aircraft (prior art).

In FIG. 7, the portion of the lap belt assembly shown includes belt 116, anchor fitting 118, and buckle 120. Anchor fitting 118 is attached to one end of belt 116 and is designed to be releasably engaged with lap belt anchor pins on the aircraft seat. After the crewmember and seat have ejected, anchor fitting 118 is released from the lap belt anchor pins on the seat to enable the crewmember to separate from the seat.

Figure 8:
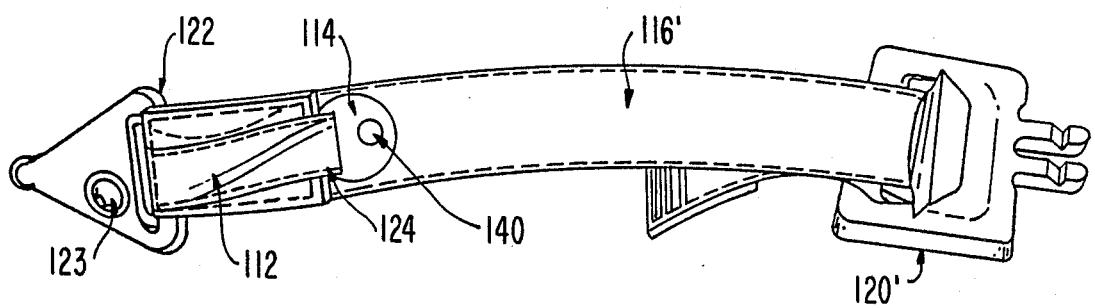
FIG. 8 is a top perspective view of one belt of the lap belt assembly which can be employed in the embodiments of this invention illustrated in FIGS. 2-6, this belt being a modification of the belt illustrated in FIG. 7.

A modified half of the lap belt assembly is illustrated in FIG. 8. This modified portion includes the same belt 116' and buckle 120'. However, anchor fitting 118 has been modified to or replaced by anchor fitting 122. In addition, restraint tab assembly 124 has been added in this embodiment of the modified lap belt assembly.

Anchor fitting 122 has cone 123 thereon which engages an end of tubular anchoring rod 110 (discussed below).

Restraint tab assembly 124 includes strap 112 and tab 114. One end of strap 112 is attached to belt 116' at anchor fitting 122. Tab 114 is attached to the opposite end of strap 112. Tab 114 has hole 140 therethrough, which engages cone 123 and which is held in place on cone 123 by anchoring rod 110, as discussed below.

One lap belt anchoring assembly which can be employed in the practice of this invention to anchor the survival kit strap assembly 146 or 146' to the seat bucket is illustrated in FIG. 9. This assembly includes anchoring rod 110 and restraint rod 142 which is rotatably attached to the seat side panel. Restraint rod 142 functions as follows.

Figure 9A:
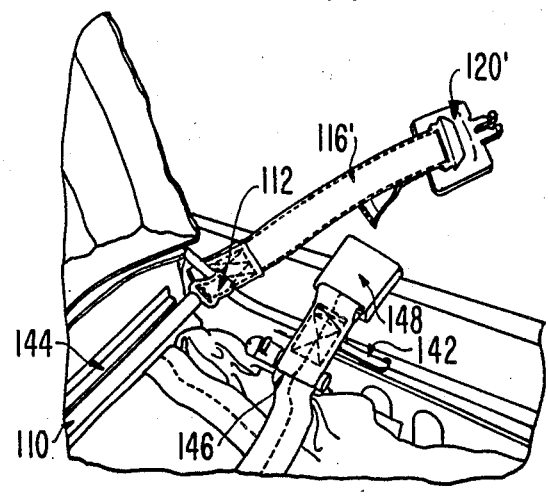
FIGS. 9A-C are perspective views showing one end of the lap belt assembly and the lap belt anchoring mechanism of the embodiments of this invention illustrated in FIGS. 2-6 and 8, and also showing, in sequence, the release of the lap belt assembly and the survival kit.

When the lap belt assembly 116 and the harness and belt assembly 20' are properly in place, the ends of anchoring rod 110 engage cones 123 (see FIG. 9A). Anchoring rod rests against elongated angle 144. Tabs 114 are located on cones 123 and are held on cones 123 by anchoring rod 110. When anchor fitting 122 is so held in place on the seat and tab 114 so positioned on cone 123, strap 112 laps over restraint rod 142 and holds restraint rod 142 in a down position.

Survival kit strap assembly 146 is slidably attached to restraint rod 142 by loop 152. Specifically, loop 152 is slidably received on restraint rod 142. End loop 154 engages a rod of the survival kit. Connector 148 receives and engages either fitting 36' or fitting 38'.

Figure 10:
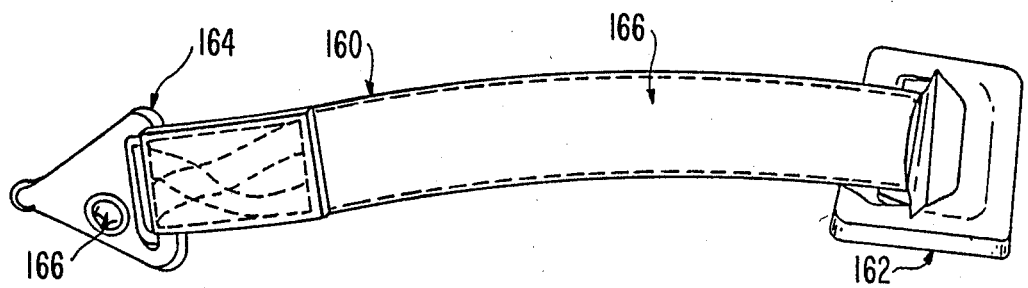
FIG. 10 is a top perspective view of a second lap belt anchoring assembly which can be employed in the embodiment of this invention illustrated in FIGS. 2-6.

Another embodiment of a lap belt anchoring assembly which can be employed in the practice of this invention is belt anchoring assembly 160 (see FIG. 10). Belt anchoring assembly 160 is designed to be employed with the modified lap belt assemblies illustrated in FIG. 8, but with the restraint tab assemblies 124 removed. In the practice of this embodiment, an anchoring belt assembly 160 is positioned on each side of seat pan 90'. Each belt anchoring assembly 160 includes bracket 162, anchoring fitting 164 and belt 166. Bracket 162 and anchoring fitting 164 are attached to opposite ends of belt 166. Each of the belts 166 passes through one of the loops 152 of survival kit strap assemblies 146.

Brackets 162 are designed to be attached to the side panel of the aircraft seat, or to any structural element in the vicinity of the seat side panel which is capable of supporting brackets 162 and the forces associated therewith.

Anchoring fittings 164 include cones 166 which engage cones 123 and tubular rod 110. When the two lap belt anchor fittings 164 are securely in place on the seat with tubular rod 110 positioned to engage the two cones 166, the two anchoring fittings 164 are firmly connected to the lap belt anchor fittings 122. However, when either lap belt anchor fitting 122 is released, the tubular anchoring rod 110 disengages from both cones 123, and anchoring fittings 164 release and are free to slide through the belt loops 152 or 152' to release the survival kit strap assemblies 146' from the seat bucket side panel.

Consequently the harness and belt assembly 20' is released from the aircraft seat. Due to this construction, the harness and belt assembly 20', along with the survival kit, will remain with the crewmember as the crewmember separates from the seat after an ejection has taken place.

Figure 5:
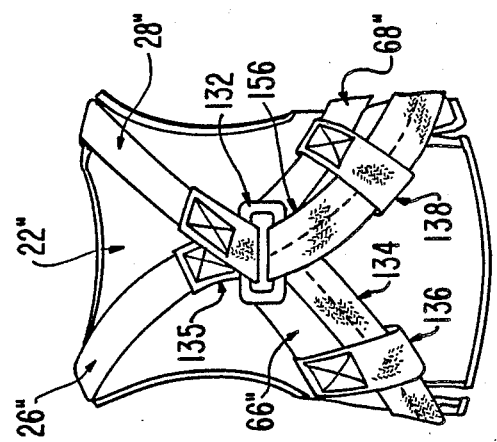
FIG. 5 is a rear view of the embodiment of this invention illustrated in FIG. 4.
Figure 4:
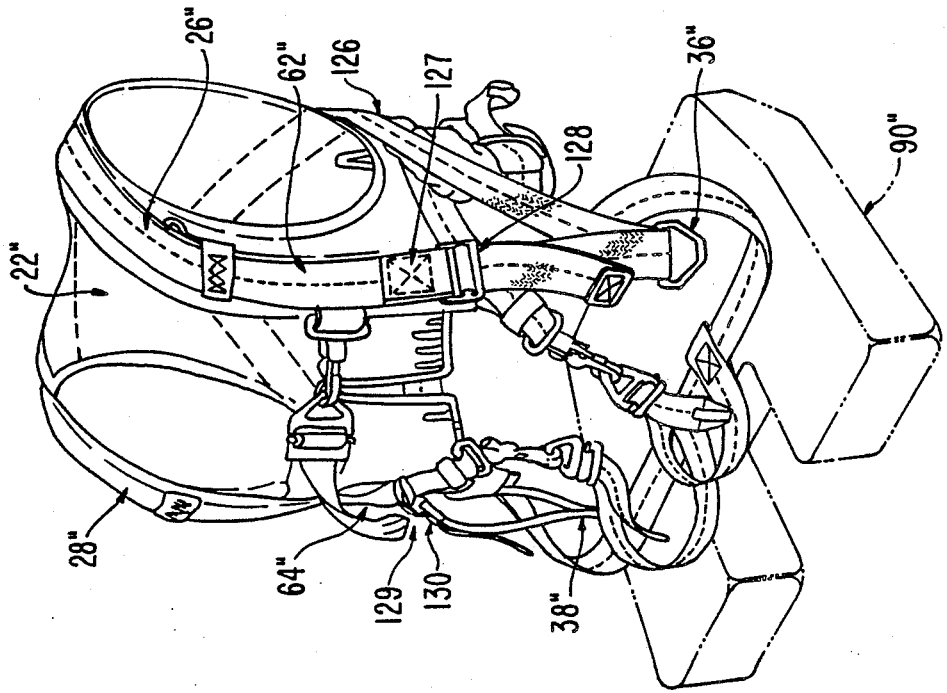
FIG. 4 is a right front perspective view of a second embodiment of this invention.

Another embodiment of this invention is illustrated in FIGS. 4 and 5, safety harness and belt assembly 20", which is identical to the embodiment illustrated in FIGS. 2 and 3, except that belt assemblies 92 and 94 have been replaced by a single belt assembly 126. Elements which are the same in assemblies 20' and 20" are given the same reference number in the Figures, except that the elements of harness and belt assembly 20" are designated with a double prime, (").

Belt assembly 126 includes short belts 127 and 129, adjusters 128 and 130, fitting 132, belt 134, short belt 135 and loops 136 and 138.

Adjusters 128 and 130 are attached to front portions 62" and 64" of lift slings 26" and 28", respectively, by short belts 127 and 129, respectively. Loops 136 and 138 are affixed to rear portions 66" and 68" of slings 26" and 28", respectively, in the approximate locations illustrated in FIG. 5. Short belt 135 is attached on its ends to rear portions 66" and 68" and slidably receives fitting 132 thereon.

One end of belt 134 is in engagement with adjuster 128. Belt 134 is then wrapped around the left side of vest 22", through loop 136, through fitting 132, through loop 138 and back around the front right side of vest 22". The other end of belt 134 is in engagement with adjuster 130. Survival kit fittings 36" and 38" are slidably received on belt 134.

For optimum performance, fitting 132 should be positioned at the approximate crossover of slings 26" and 28".

At the option of the crewmember, belt 134 can be stitched together at its crossover point 156 just below fitting 132 (see FIG. 5). The stitching of belt 134 at this point will improve the lateral support of the harness and belt assembly since belt 134 will no longer be capable of sliding through fitting 132.

The embodiments of this invention illustrated in the Figures function as follows.

A crewmember employs a harness and belt assembly according to this invention by first placing vest 22' or 22" around his shoulders and upper torso, attaching connector 60 to adjuster 58 and attaching connectors 82 to adjusters 83. The various adjusters 58, 70, 83 and 88 can be adjusted such that the various parts of harness and belt assembly 20' or 20" fit the crewmember properly.

Lap belt anchor fitting connectors 122 are releasably attached to the seat, restraint tab assemblies 124 are held on cones 123 by anchor rod 110 and loops 152 engages restraint rods 142, as discussed above.

Next, with respect to the embodiment illustrated in FIGS. 2 and 3, harness and belt assembly 20", survival kit fittings 36' and 38' are connected to connectors 148. The adjusters (including adjuster 70) of belt assemblies 92 and 94 can be adjusted to properly fit the crewmember. Belts 96 and 102 are free to slide through fittings 36' and 38'. This provides the crewmember with the ability to rotate his or her torso freely while restraining the crewmember's movement in the plus/minus Gy and minus Gz directions.

With respect to the embodiment illustrated in FIGS. 4 and 5, the next step is the connection of fittings 36"

and 38" to connectors 148. Adjusters 128 and 130 can be employed to adjust belt assembly 126 to fit the crewmember properly. Belt 134 is free to slide through fittings 36" and 38", fitting 132 and loops 136 and 138 (see FIGS. 4 and 5). These relative sliding movements provide the crewmember wearing this harness and belt assembly 20" with the capability to move laterally (Gy) while restraining the crewmember's movement in the minus Gz direction.

Figure 9B:
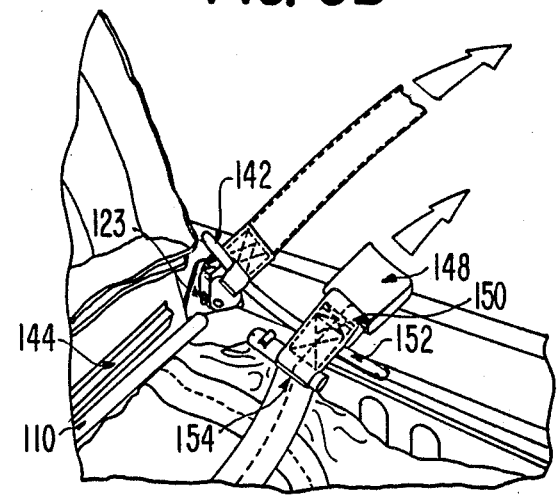
Figure 9C:
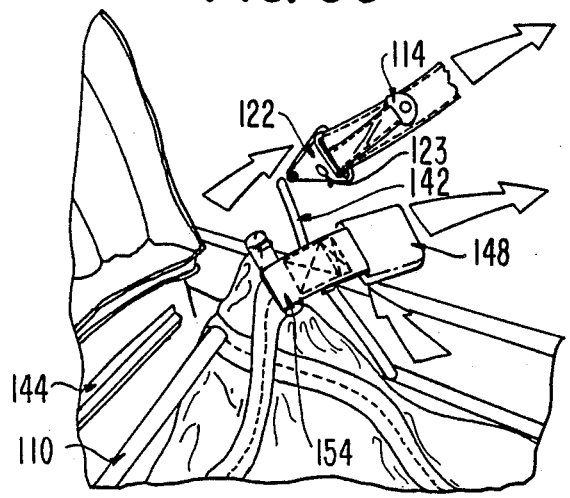

After the crewmember ejects in the seat while wearing either harness and belt assembly 20' or 20", lap belt anchors 122 will be released from the lap belt anchoring pins permitting anchoring rod 110 to slip off cones 123 as shown in FIGS. 9A–C.

The release of the anchoring rod 110 will free tab 114 of restraint tab assembly 124 such that tab 114 will slide off the end of cone 123. This will release restraint rod 142 which was being held in a down position by strap 112. Parachute forces on the crewmember will cause tension on survival strap assembly 146 as shown by the arrow in FIG. 9B. This tension force will rotate restraint rod 142 upward, which will in turn cause loop 152 to slide up and off restraint rod 142. Survival kit strap assembly 146 will then pull the survival kit upward and out of the seat bucket with the crewmember.

Due to this arrangement, the crewmember with the survival kit is released in an ejection whenever the lap belt assembly is released from the seat.

Many other embodiments, modifications and improvements will become apparent to those skilled in the art once given this disclosure. Such other embodiments, improvements and modifications, not only to the PCU-15 or -16 harnesses, but also to other harnesses for other ejection seats, are considered to be within the scope of this invention as defined by the following claims:

What is claimed is:

1. A harness and belt assembly for a crewmember of an aircraft comprising:
   a left sling which is designed to extend from the left side of the chest of a crewmember, over the left shoulder of the crewmember to the crewmember's back;
   a right sling which is designed to extend from the right side of the chest of a crewmember, over the right shoulder of the crewmember to the crewmember's back;
   a first belt assembly having first and second ends;
   said first end of said first belt assembly being attached to one of said left and right slings at the portion of said slings designed to be adjacent the chest of said crewmember, said belt assembly being designed to extend around the back of the crewmember, said second end of said belt assembly being attached to the other of said slings;
   a survival kit attachment fitting which slidably engages said first belt assembly between said first and second ends; and
   means for releasably attaching said fitting to a seat in an aircraft.

2. A harness and belt assembly according to claim 1 wherein:
   said first belt assembly includes first and second belts and an adjuster, said first and second belts having first and second ends;
   said first end of said first belt comprising said first end of said first belt assembly, said first end of said second belt comprising the second end of said first belt assembly;
   said second ends of said belts being attached to said adjuster such that the adjuster may be employed to adjust the total length of said first belt assembly.

3. A harness and belt assembly according to claim 2 further comprising:
   a second belt assembly including third and fourth belts and a second adjuster;
   said third and fourth belts having first and second ends, said second ends of said third and fourth belts being attached to said second adjuster such that said adjuster may be employed to adjust the total length of said third and fourth belts;
   said first end of said third belt being attached to the other of said right and left slings at the portion of said slings designed to be adjacent the chest of the crewmember, said first end of said fourth belt being attached to said one of said right and left slings at the portion of said slings designed to be adjacent the back of the crewmember;
   a second survival kit attachment fitting which slidably engages one of said third and fourth belts; and
   second means for releasably attaching said second fitting to the seat.

4. A harness and belt assembly according to claim 2 wherein said means includes a survival kit belt assembly and an anchoring assembly, said survival kit belt assembly having means for releasably engaging said anchoring assembly, said anchoring assembly being affixed to said seat.

5. A harness and belt assembly according to claim 4 wherein said means for releasably engaging said anchoring assembly includes a loop attached to said survival kit belt assembly.

6. A harness and belt assembly according to claim 3 wherein:
   said right and left slings cross at the back of said crewmember; and
   said first ends of said second and fourth belts being attached to said slings below the location where said right and left slings cross.

7. A harness and belt assembly according to claim 1 wherein:
   said means includes a survival kit belt and an anchoring assembly including a belt, a bracket and an anchoring fitting;
   said bracket and said anchoring fitting being attached to the ends of said belt and attachable to said aircraft seat; and
   said survival kit belt slidably engages said anchoring assembly belt.

8. A harness and belt assembly according to claim 1 wherein:
   said means comprises a lap belt assembly, a lap belt anchoring assembly, a survival kit strap assembly, and a restraint rod;
   said restraint rod being rotatably attached to an aircraft seat, said survival kit strap assembly slidably engaging said restraint rod and being engageable with said fitting;
   said lap belt assembly and said lap belt anchoring assembly retain said restrain rod in a down position.

9. A harness and belt assembly according to claim 8 wherein:
   said lap belt assembly has first and second ends and includes an anchor fitting and a tab assembly attached to said first end of said lap belt assembly, said tab assembly including a strap having first and second ends and a tab, said first end of said strap being attached to said lap belt, said tab being attached to said second end of said strap;

said anchor fitting being releasably attachable to the seat and including a cone;

said tab including means for engaging said cone;

said strap engaging said restraint rod when said tab engages said cone.

10. A harness and belt assembly according to claim 9 further comprising:

an anchoring rod which engages said cone to retain said tab on said cone;

wherein said strap retains said restraint rod in a predetermined position when said anchor fitting is attached to seat and said tab is in engagement with said cone; and when said anchor fitting is released from the seat and said tab disengages said cone, said survival kit strap assembly is free to slide off said restraint rod.

11. A harness and belt assembly according to claim 1 wherein:

said second end of said first belt assembly is attached to the other of said slings at the portion of the slings designed to be adjacent the chest of the crewmember;

said first belt assembly further comprising a second fitting attached to said slings at the portion of said slings designed to be adjacent the back of the crewmember; and said first belt assembly slidably engaging said second fitting.

12. A harness and belt assembly according to claim 11 wherein:

said first assembly includes first and second belts having first and second ends and an adjuster;

said first end of said first belt comprising said first end of said first belt assembly and said first end of said second belt comprising the second end of said first belt assembly; said second ends of said belts being attached to said adjuster.

13. A harness and belt assembly according to claim 12 wherein:

said means includes a survival kit belt and an anchoring belt assembly including a third belt, a bracket and an anchoring fitting;

said bracket and said anchoring fitting being attached to the ends of said third belt and attachable to said aircraft seat; and said survival kit belt slidably engages said third belt.

14. A harness and belt assembly according to claim 11 wherein:

said right and left slings cross at the back of said crewmember; and said second fitting being located at the location where said right and left slings cross.

15. A harness and belt assembly according to claim 11 wherein:

said means comprises a lap belt assembly, a lap belt anchoring assembly, a survival kit strap assembly, and a restraint rod;

said restraint rod being rotatably attached to an aircraft seat, said survival kit strap assembly slidably engaging said restraint rod and being engageable with said fitting;

said lap belt assembly and said lap belt anchoring assembly retain said restraint rod in a down position.

16. A harness and belt assembly for a crewmember of an aircraft comprising:

a vest to be worn about the chest and shoulders of a crewmember, said vest including a front portion to be adjacent the crewmember's chest and a back portion to be adjacent the crewmember's back;

a first belt assembly including first and second belts and an adjuster, said first and second belts each having first and second ends;

said first end of said first belt being attached to said front portion of said vest, said second end of said first belt engaging said adjuster;

said first end of said second belt being attached to said back portion of said vest, said second end of said second belt engaging said adjuster;

wherein the adjuster may be employed to adjust the total length of said first and second belts;

a survival kit attachment fitting which slidably engages one of said first and second belts; and first means for releasably attaching said fitting to a seat in an aircraft.

17. A harness assembly according to claim 16 wherein said first means includes a survival kit belt assembly and an anchoring assembly, said survival kit belt assembly having means for releasably engaging said anchoring assembly, said anchoring assembly being affixed to said seat.

18. A harness and belt assembly according to claim 17 wherein:

said vest includes left and right slings, said slings extending between the front and back portions of said vest such that each said sling has front and rear portions; and said first ends of said belts being attached to said slings.

19. A harness and belt assembly for a crewmember of an aircraft comprising:

a left sling which is designed to extend from the left side of the chest of a crewmember, over the left shoulder of the crewmember to the crewmember's back;

a right sling which is designed to extend from the right side of the chest of a crewmember, over the right shoulder of the crewmember to the crewmember's back;

a belt assembly including first and second belts, an adjuster and a fitting, said first and second belts each having first and second ends;

said first end of said first belt being attached to said left sling at the portion of said left sling designed to be adjacent the chest of said crewmember;

said first end of said second belt being attached to said right sling at the portion of said right sling designed to be adjacent the chest of said crewmember;

said second ends being attached to said adjuster such that said adjuster may be employed to adjust the total length of said belts;

said fitting being attached to said slings at the portion of said slings designed to be adjacent the back of the crewmember;

said belt assembly extending from the portion of said left sling designed to be adjacent the chest of the crewmember through the fitting and to the portion of the right sling designed to be adjacent the chest of the crewmember;

said belt assembly slidably engaging the fitting;

first and second survival kit attachment fittings, said first survival kit attachment fitting slidably engaging said first belt, said second survival kit attachment fitting slidably engaging said second belt; and means for releasably attaching said survival kit attachment fittings to a seat in an aircraft.

20. A harness and belt assembly for a crewmember of an aircraft comprising:

a left sling which is designed to extend from the left side of the chest of a crewmember, over the left shoulder of the crewmember to the crewmember's back;

a right sling which is designed to extend from the right side of the chest of a crewmember, over the right shoulder of the crewmember to the crewmember's back;

a first belt assembly including first and second belts and an adjuster, said first and second belts each having first and second ends;

said first end of said first belt being attached to one of said left and right slings at the portion of said slings designed to be adjacent the chest of said crewmember;

said first end of said second belt being attached to the other of said left and right slings at the portion of said sling designed to be adjacent the back of said crewmember;

said second end of said belts engaging said adjuster;

wherein the adjuster may be employed to adjust the total length of said first and second belts;

a survival kit fitting which slidably engages one of said first and second belts;

means for releasably attaching said fitting to a seat in an aircraft.

* * * * *